Aug. 19, 1958  M. C. WILSON  2,848,070
WHEEL BLOCK

Filed Aug. 22, 1957  2 Sheets-Sheet 1

INVENTOR
MARION C. WILSON
BY Brown, Jackson
Boettcher & Dienner
ATTORNEYS

Aug. 19, 1958  M. C. WILSON  2,848,070
WHEEL BLOCK
Filed Aug. 22, 1957  2 Sheets-Sheet 2

INVENTOR
MARION C. WILSON
BY Brown, Jackson,
Boettcher & Drenner
ATTORNEYS

United States Patent Office 2,848,070
Patented Aug. 19, 1958

2,848,070

WHEEL BLOCK

Marion C. Wilson, Hammond, Ind., assignor to Calumet Steel Castings Corporation, Hammond, Ind., a corporation of Indiana Application August 22, 1957, Serial No. 679,702

3 Claims. (Cl. 188—32)

My present invention pertains to wheel blocks for wheeled vehicles, and more particularly, to a wheel block having a contoured blocking surface for maximum registration with a pneumatic tired airplane wheel and especially, a wheel of a jet airplane.

A pneumatic tire supporting a heavy load is not, of course, perfectly circular, but is partially deformed by the flattening of the deck or ground contacting portion of the tire. The deformation due to the compression of a portion of the tire is particularly pronounced in the case of a jet airplane tire on which I have conducted experiments and found that the radius from the axle perpendicular to the deck, known as the roll radius, averages approximately 16% less than the free or normal radius of the wheel. This means, for example, that in a pneumatic tired wheel having a 12½" radius, the axle is actually only 10½" above the ground due to the compression of the tire. The flattening of the tire is reflected in the side walls of the tire also, which are widest at the point of contact and gradually taper to normal width toward the free or normal radius of the tire.

In the past, it has been the practice to ignore the deviation from the circular form due to compression of the pneumatic tire under a working load and to construct a wheel block having a flat plane inclined blocking surface, or one having an inclined surface of simple curvature. However, I have found that the most effective use of a wheel block comes from utilizing a blocking surface on a wheel block which, as nearly as possible, conforms to the contours of the wheel to be blocked as the wheel actually exists in operation, namely, flattened or compressed, and not as normally considered on a theoretical basis, i. e., not compressed under a working load. This type of blocking surface has the most desirable effect of immediately transferring the load on the tire to the wheel block's ground gripping means or calks.

Accordingly, a principle object of this invention is the provision of a wheel block which overcomes the deficiencies of prior type wheel blocks by being provided with a blocking surface which conforms to and complements the contours of the wheel to be blocked so as to immediately transfer load to the wheel block's ground gripping means to thus improve the effective use of wheel blocks.

Briefly, my new and improved wheel block is constructed with its blocking surface developed from different horizontal and vertical radii so that it conforms to the contour of the loaded tire and also takes into account the lowered axle of the wheel.

In addition, to make my new and improved wheel block particularly adaptable for airplanes when wind resistance has always been a problem to be considered in the design of wheel blocks for such use because of the danger of the block being blown about the field by prop wash or jet engine blast, I have provided for the minimum of air resistance by forming large vents in the blocking surface, and by providing a baffle plate on the underside of the blocking surface preventing concentration of air within the confines of the block tending to move the block. This baffle plate also serves still another purpose; that of rigidifying the block, yet keeps the block light enough to be easily portable.

Accordingly, still another object of my invention is the provision of a new and improved wheel block especially adaptable for use in the aircraft field, and such that the block is not susceptible to being blown about by blasts of air developed by the aircraft or otherwise.

In addition to the above-mentioned features, I have also provided my new and improved wheel block with self-sharpening ground engaging calks and with improved ground gripping characteristics. A plurality of calks are so constructed and arranged on my wheel block so that the initial purchase with the ground, i. e., initial gripping of the ground, is accomplished by two outside calks thus to provide ease of initial stage of engagement followed by the second stage of engagement of the intermediate calks to provide stability and improved ground gripping characteristics. Furthermore, I have arranged the calks and the means connecting the calks and the blocking surface such that only a minimum area of the wheel block is in contact with the ground so as to avoid adherence to the ground or a flight deck in freezing conditions. The calks themselves are also so constructed and arranged so as to be self-sharpening during use. These desirable features will be more apparent from a more detailed description hereinafter.

Thus still another object of my invention is to provide ground gripping means or calks which are effective at two different stages of loading the wheel blocks so as to maintain tenacity of purchase along with ease of initial purchase.

A still further object of my invention is to provide a wheel block with a minimum of ground purchase area so as to provide easier and quicker initial purchase.

Another object of my invention is to provide a wheel block with a minimum of contact area between the ground and the block so as to minimize freezing of the block to the ground.

Yet another object of my invention is to provide a wheel block with self-sharpening ground engaging calks.

These and other objects of my invention will be apparent to one skilled in the art, from a reading of the following detailed description, when taken in conjunction with the drawings, wherein.

Figure 1:
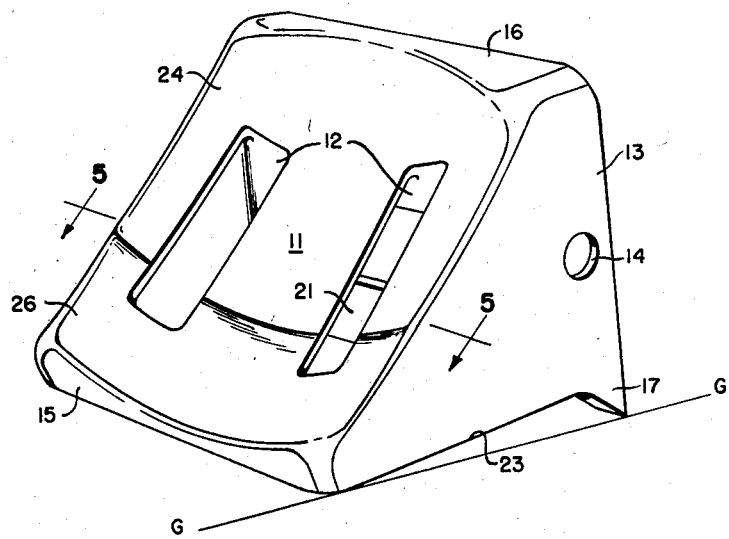
Fig. 1 is a perspective view of a preferred embodiment of my invention showing to advantage the blocking surface.
Figure 2:
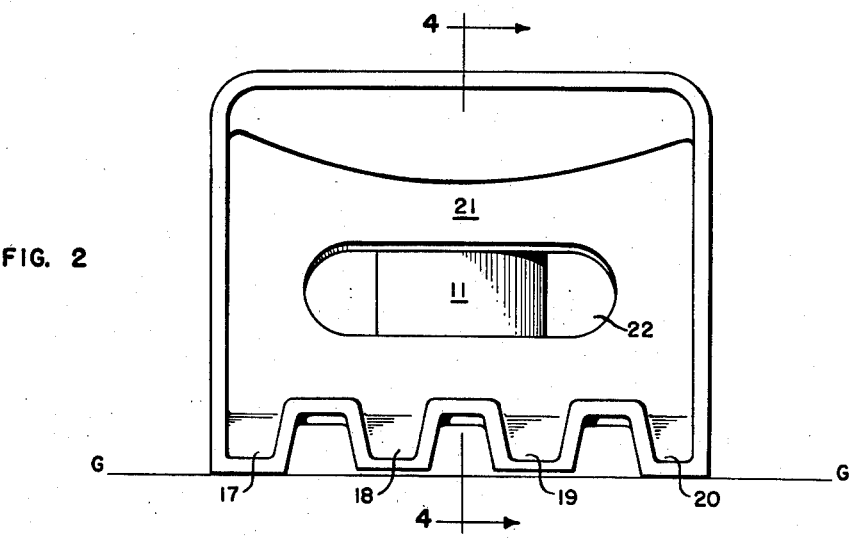
Fig. 2 is a rear elevational view of the preferred embodiment of my invention showing to advantage the vented baffle plate and the construction and arrangement of the calks.
Figure 3:
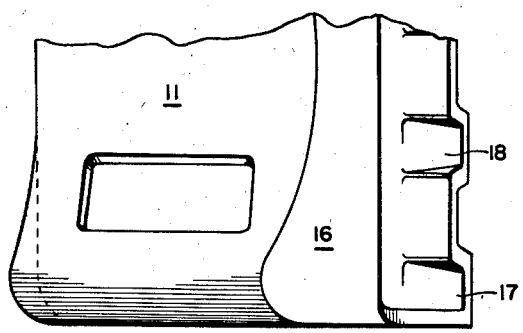
Fig. 3 is a partial plan view of the preferred embodiment of my invention showing to advantage the complex curvature of the blocking surface.
Figure 4:
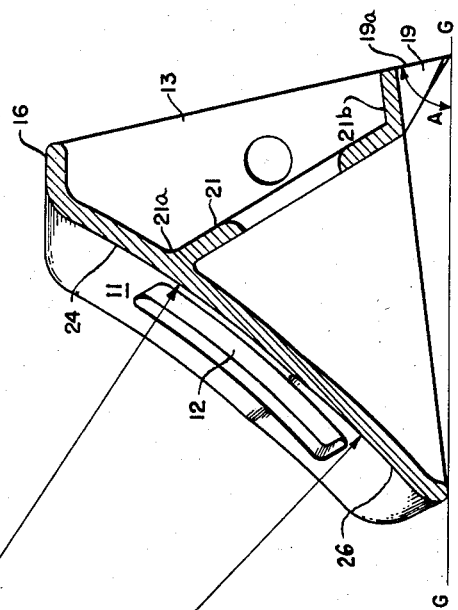
Figure 5:
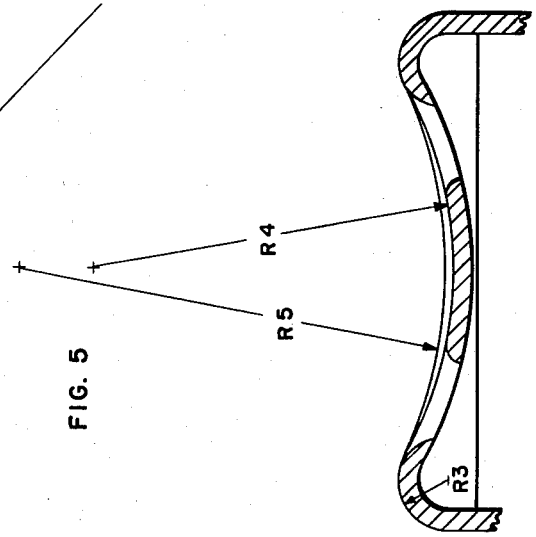

Fig. 4 is a sectional view of the preferred embodiment of my invention, taken along the lines 4—4 of Fig. 2 looking in the direction of the arrows, and showing the center of curvature and length of the developing vertical radii of the complex curvature of the blocking surface; and Fig. 5 is a sectional view of a preferred embodiment of my invention taken along the line 5—5 of Fig. 1 looking in the direction of the arrows and showing the center of curvature and length of the developing horizontal radii of the blocking surface.

Referring now to Fig. 1, which illustrates a preferred form of my invention, and shows my new and improved metallic wheel block as comprising a substantially concave complex blocking surface 11 having two vertically arranged elongated air vents 12 therein and supported at a pre-determined angle to the deck or ground line G—G, by two substantially triangular support plates 13 integrally cast therewith and vertically disposed on each side of the blocking surface and so constructed and arranged to support the inclined blocking surface 11 during use. For convenience and safety, a pair of apertures (one shown) 14, are provided in the support plates 13 to be utilized with a tow rope or chain, so that the block may be removed from beneath the wheels of a plane without the attendant approaching the close proximity of the plane's prop wash or jet exhaust.

The blocking surface 11 terminates at its bottom edge in an integrally cast face plate 15 whose upper surface is shaped to conform with the curvature of the blocking surface and which forms an acute angle with the blocking surface 11 and with the ground so that the lowermost portion of the curved surface 11 is substantially in contact with the ground, as is most clearly shown in Fig. 4. The upper edge of the blocking surface 11 terminates in a substantially horizontally disposed top plate 16, and whose forward surface is shaped to conform with the curvature of the blocking surface and which is also integrally cast with the blocking surface and with the supporting plates 13.

Referring now to Fig. 2, there is shown four ground engaging calks 17, 18, 19 and 20, each tapered diminishingly in the direction of the ground and integrally cast between the two support plates 13 and forming a part of a reinforcing baffle plate 21. The baffle plate 21 is angularly disposed with respect to block surface 11 and formed integrally with the underside of blocking surface 11 as shown at 21a in Fig. 4 and has a relatively flat horizontally disposed bar-like portion 21b on which the calks are formed. Baffle plate 21 further is provided with a hand hole 22 to provide easy handling of the block. The baffle plate serves the multiple purpose of giving additional support to the blocking surface 11, reinforcing and rigidifying the whole structure, and with the hole permitting free flow of air and preventing the build-up of air pockets that might otherwise act on the confined inner corners of the wheel block to tend to move it.

The outer ground engaging calks 17 and 20 disposed nearest or as part of support plates 13, are formed slightly longer than the intermediate calks 18 and 19, as more clearly shown in Fig. 2, so that in the unloaded condition the block is supported only by the edges of the outer calks 17 and 20 and the edge of the face plate 15. It will be noted that the lower edges 23 (Fig. 1) of support plates 13 are angularly disposed with respect to ground and not in contact therewith when the block is unloaded, due to the protrusion of calks 17 through 20, beyond the two edges 23. Because of this minimum contact of the block with the ground by the angular disposition of edges 23 and by the disposition of baffle plate 21, the inconvenience of the block adhering to the ground due to freezing or mud is greatly minimized.

The longer, outside calks, 17 and 20, are the initial purchase calks, i. e., when the block is loaded as by a tire engaging blocking surface 11, the calks 17 and 20, being longer, make the initial entry into the ground and as more load is applied to the blocking surface 11, the intermediate shorter calks 18 and 19 make an entry into the ground to increase the stability of the block. By the utilization of the longer, outer calks providing a first stage of engagement, a minimum force is required for initial purchase and the block is positioned at the first impact of load. In other words, the transfer of the slightest load is immediately reflected in the outer calks by the positioning of the block and thus the block is not subject to the shortcomings of previously known blocks which would tend to move about in the ground until a sufficient pressure was generated to urge all calks, being of equal length, into gripping engagement with the ground. This feature is important in connection with the complex curvature of the blocking surface 11 both of which contribute to an improved wheel block as will be apparent from the further description hereinafter.

In further connection with these calks, I have introduced a "self-sharpening" feature therein. Attention is directed to Fig. 4 where it can be seen that the new edge 19a of calk 19 forms an acute angle "A" with the ground. Since wear on the calks of a wheel block of this type is found to be caused by dragging the block along the ground whereby the wear is along a line parallel to the ground, I have found that by forming the rim edges of each calk with an acute angle, this rear parallel to the ground maintains a sharp point on each calk. This is not so if the angle "A" is obtuse and while I have described this feature in connection with calk 19, all the calks of my wheel block are thus formed—the rear edge of calk 17 forming part of support plate 13 as can be seen in Fig. 1.

As previously mentioned, an outstanding accomplishment of my invention lies in the feature of suitably fitting the wheel block to a pneumatically tired wheel, as such wheel actually exists under a normal working load, taking into consideration the compression of the tire and the consequent expansion of the side walls thereof. The blocking surface 11 of my wheel block is so constructed and arranged to complement the complex curvature of the tire under such a working load thus to more effectively utilize my wheel block and to immediately transfer such a load to the calks to obtain initial purchase of the outer calks as above explained.

In connection with the development of such a complex curvature of the blocking surface 11, attention is now directed to Fig. 4. In the embodiment shown, the vertical curvature of the upper portion of the blocking surface 11, indicated at 24, is an arc of a circle whose radius R1 equals the free radius of the wheel and whose center is on a line whose height is equal to the roll radius of the wheel; the free radius being the radius of the wheel not subject to a work load and the roll radius being the radius of the wheel subject to a work load. The roll radius in this instance, obviously equals the axle height above the ground line. The vertical curvature of the lower portion of the blocking surface 11, indicated at 26 in Fig. 4, is an arc of a circle whose radius R2 is equal to R1 and whose center is below the axle height and further removed horizontally from the surface 11. The generation of the complex curvature of the blocking surface by the two arcs in this manner closely approximates the contour of the tire near the point of maximum deformation and permits the block to fit closely against the wheel when placed in position. The exact distance of the center of R2 from the center of R1 is determined from the tire size with which it is to be used and the two arcs are suitably blended to one another in the embodiment shown to form a smooth surface. By way of illustration, I have found in practice that a wheel block for use with a 12½" radius wheel having a roll radius 10½" by making the axle height of the wheel 10½" above the ground line G—G and placing the center of radius R2 at a point ⅝" horizontally removed from the blocking surface 11 and ¾" below the axle height.

The widening or expansion of the side walls of the tire under load toward and at the point of maximum compression is accommodated by developing the horizontal curvature from a vertical center line by two radii R4 and R5 illustrated in Fig. 5. The radius R4 equals the width of the tire not subject to load and its arc forms the horizontal curvature for the upper portion 24 of the blocking surface 11. The horizontal curvature of the lower portion 26 of the blocking surface 11 is developed by a radius R5 which varies in length from that of R4 at the intersection of upper portion 24 and lower portion 25 to a greater value at the intersection of lower portion 26 with the face plate 15. The exact lengths of radii R4 and R5 should be determined by the size and deformation of the tire with which the block is to be utilized.

By way of illustration, I have found that the deformation of a 12½" radius tire is such that R4 may be 5" in length and R5 varies from 5" to 6" from the intersection of the upper and lower portions of the blocking surface to the intersections of the blocking surface with the face plate.

In this manner, not only is the vertical compression of the tire accommodated but also the expansion of the tire's side walls and with a blocking surface so constructed and arranged, as taught by this description, the load is transferred to the calks for initial purchase as soon as possible—obviously a desirable feature. It is to be noted also that all other radii of curvature in my wheel block are not critical and are merely in keeping with good casting practice.

While I have shown and described a preferred embodiment of my present invention, it will be understood by those skilled in the art that various re-arrangements and modifications may be made therein without departing from the spirit and scope of my invention, as defined in the appended claims.

I claim:

1. In a wheel block for use with a pneumatic tired wheel subject to vertical compression and horizontal expansion under a working load to produce a free radius and a roll radius with the ground whereby a complex contour is formed, a blocking surface having a complex curvature generated from a first and second vertical radii, each having a length equal to the free radius, said first radius having its center at the axle height above the ground and said second radius having its center a distance closer to the ground than the axle height and horizontally removed from the blocking surface, said curvature thereby being so constructed and arranged to complement said tire under said working load whereby the block may fit closely against the contour of said tire when placed into position.

2. In a wheel block for use with a pneumatic tired wheel subject to vertical compression and horizontal expansion under a working load to produce a free radius and a roll radius with the ground whereby a complex contour is formed, a blocking surface having a complex curvature generated from a first and second vertical radii, each having a length equal to the free radius, said first radius having its center at the axle height above the ground and said second radius having its center a distance closer to the ground than the axle height and horizontally removed from the blocking surface, said curvature thereby being so constructed and arranged to complement said tire under said working load whereby the block may fit closely against the contour of said tire when placed into position, and a plurality of calks adapted to purchase the ground when said block is placed into position including end calks and intermediate calks, said end calks being arranged to support said wheel block free of said intermediate calks until the ground is initially purchased.

3. In a wheel block for use with a pneumatic tired wheel subject to vertical compression and horizontal expansion under a working load to produce a free radius and a roll radius with the ground whereby a complex contour is formed, a blocking surface having a complex curvature generated from a first and second vertical radii, each having a length equal to the free radius, said first radius having its center at the axle height above the ground and said second radius having its center a distance closer to the ground than the axle height and horizontally removed from the blocking surface, said curvature thereby being so constructed and arranged to complement said tire under said working load whereby the block may fit closely against the contour of said tire when placed into position, two end plates integral with said blocking surface for supporting said surface at a predetermined inclination to the ground, a ground engaging end calk secured to each end plate and protruding below said plate, and a plurality of intermediate calks secured between said end calks, said intermediate calks being recessed from said end calks whereby said wheel block is supported on the ground by the two end calks and a forward edge of said inclined blocking surface.

References Cited in the file of this patent

UNITED STATES PATENTS 2,304,305     Fulton _____ Dec. 8, 1942

FOREIGN PATENTS 922,396     Germany _____ Jan. 13, 1955